(12) United States Patent
Bialecki, Jr. et al.

(10) Patent No.: US 7,268,682 B2
(45) Date of Patent: Sep. 11, 2007

(54) ROOM MONITORING AND LIGHTING SYSTEM

(76) Inventors: George Bialecki, Jr., 624 N. Highland Ave., Arlington Heights, IL (US) 60004; Sudip K. Mazumder, 851 S. Morgan St., M/C 154, 1020 SEO, Chicago, IL (US) 60607

( * ) Notice: Subject to any disclaimer, the term of this patent is extended or adjusted under 35 U.S.C. 154(b) by 142 days.

(21) Appl. No.: 10/785,734

(22) Filed: Feb. 23, 2004

(65) Prior Publication Data

US 2004/0257237 A1   Dec. 23, 2004

Related U.S. Application Data

(60) Provisional application No. 60/449,624, filed on Feb. 24, 2003.

(51) Int. Cl.
*G08B 13/00* (2006.01)
(52) U.S. Cl. ............ 340/565; 340/541; 340/555; 340/573.1; 315/149; 315/159; 362/276
(58) Field of Classification Search ............... 315/158, 315/159, 149, 308; 362/276, 642, 802
See application file for complete search history.

(56) References Cited

U.S. PATENT DOCUMENTS

| | | | | | |
|---|---|---|---|---|---|
| 5,212,672 | A | * | 5/1993 | Loisch et al. ............ | 368/79 |
| 5,457,442 | A | * | 10/1995 | Lucero ............... | 340/693.1 |
| 5,600,305 | A | * | 2/1997 | Stafford et al. ......... | 340/573.1 |
| 5,808,552 | A | * | 9/1998 | Wiley et al. ............ | 340/573.4 |
| 5,867,099 | A | * | 2/1999 | Keeter ................ | 340/567 |
| 6,275,163 | B1 | * | 8/2001 | Bogorad et al. ........ | 340/686.1 |
| 6,756,998 | B1 | * | 6/2004 | Bilger ................ | 715/764 |
| 6,788,206 | B1 | * | 9/2004 | Edwards ............... | 340/573.1 |
| 6,838,994 | B2 | * | 1/2005 | Gutta et al. ........... | 340/575 |
| 6,876,303 | B2 | * | 4/2005 | Reeder et al. .......... | 340/573.1 |
| 6,888,323 | B1 | * | 5/2005 | Null et al. ............ | 315/294 |
| 6,917,293 | B2 | * | 7/2005 | Beggs ................ | 340/573.1 |

* cited by examiner

*Primary Examiner*—Davetta W. Goins
(74) *Attorney, Agent, or Firm*—Brian J. Laurenzo; Jason M. Hunt

(57) ABSTRACT

A system for improving the safety of a room occupied by a patient includes a sensor for monitoring when the patient is out of bed. The sensor sends a signal that gives an alert to a care giver that the patient is out of bed. Lights in the room are slowly illuminated to provide light for the patient. A second sensor may sense when the patient has returned to bed and correspondingly dim the lights. The history of the patient being in and out of bed, and of the care giver responding to alerts may be recorded in a log. A programmable micro controller is used to control the system.

21 Claims, 15 Drawing Sheets

Turn off lamps

ROOM MONITORING AND LIGHTING SYSTEM

CLAIM OF PRIORITY

This application claims priority from U.S. Provisional Application Ser. No. 60/449,624, filed Feb. 24, 2003, the entire contents of which are hereby incorporated by reference.

FIELD OF INVENTION

This invention relates to a system for monitoring a room inhabited by an occupant, and for providing automatic control of the lighting in that room. More particularly, this invention relates to a system that uses motion sensors to determine whether an occupant is in or out of bed, that controls lighting within the room based on whether the occupant is in or out of bed, and that provides notice to a remote location when the occupant gets out of bed.

BACKGROUND

Hospitals, and elderly care facilities, and the like, have residents or patients that occupy rooms. It can be dangerous for these people to get out of bed when the room is dark. However, often they wish to have the room dark in order to sleep. Also, if the inhabitant of the room were to fall they may not be able to get back up, and may have no way of communicating their situation to someone who can help them.

It is therefore desirable to have some means for automatically illuminating the room when an occupant gets out of bed. It is additionally desirable to provide a notification to a caretaker that the occupant has gotten out of bed, so that the caretaker can check to see if the occupant needs any help, and to verify that the occupant was able to safely return to bed. The system should preferably encourage the caretakers to respond to such notifications and verify that the caretaker has responded.

The present invention meets these needs.

SUMMARY OF THE INVENTION

According to one embodiment of the invention, a system is disclosed for improving the safety of a room that is occupied by a patient in a bed. The system includes a first sensor for detecting when the patient has gotten out of bed. The sensor sends a signal which activates artificial lighting within the room upon detecting that the patient is out of bed. Preferably, the artificial lighting can be varied in intensity, and is activated at a dim level and slowly increased in intensity. A second sensor may be included in the system to detect when the patient has returned to bed. The second sensor would send a signal causing the artificial lighting to dim upon sensing that the patient had returned to bed. The system may also include an alarm indicator for indicating to a caretaker that the patient has gotten out of bed. Preferably the alarm is an indicator light that remains illuminated until manually deactivated by a caretaker. The system may also include a recording device in connection with the first sensor for making a log entry of times when the first sensor was activated. The first sensor may be placed in operable communication with a remote information receiving device to alert a caretaker in a remote location that a patient is out of bed. The first and second sensors may be motion detectors that use radio frequency signals to signal to a transceiver when they detect that a patient is in or out of bed.

Other aspects, features and details of the present invention can be more completely understood by reference to the following detailed description in conjunction with the drawings and the appended claims.

DETAILED DESCRIPTION OF PREFERRED EMBODIMENTS

Figure 1:
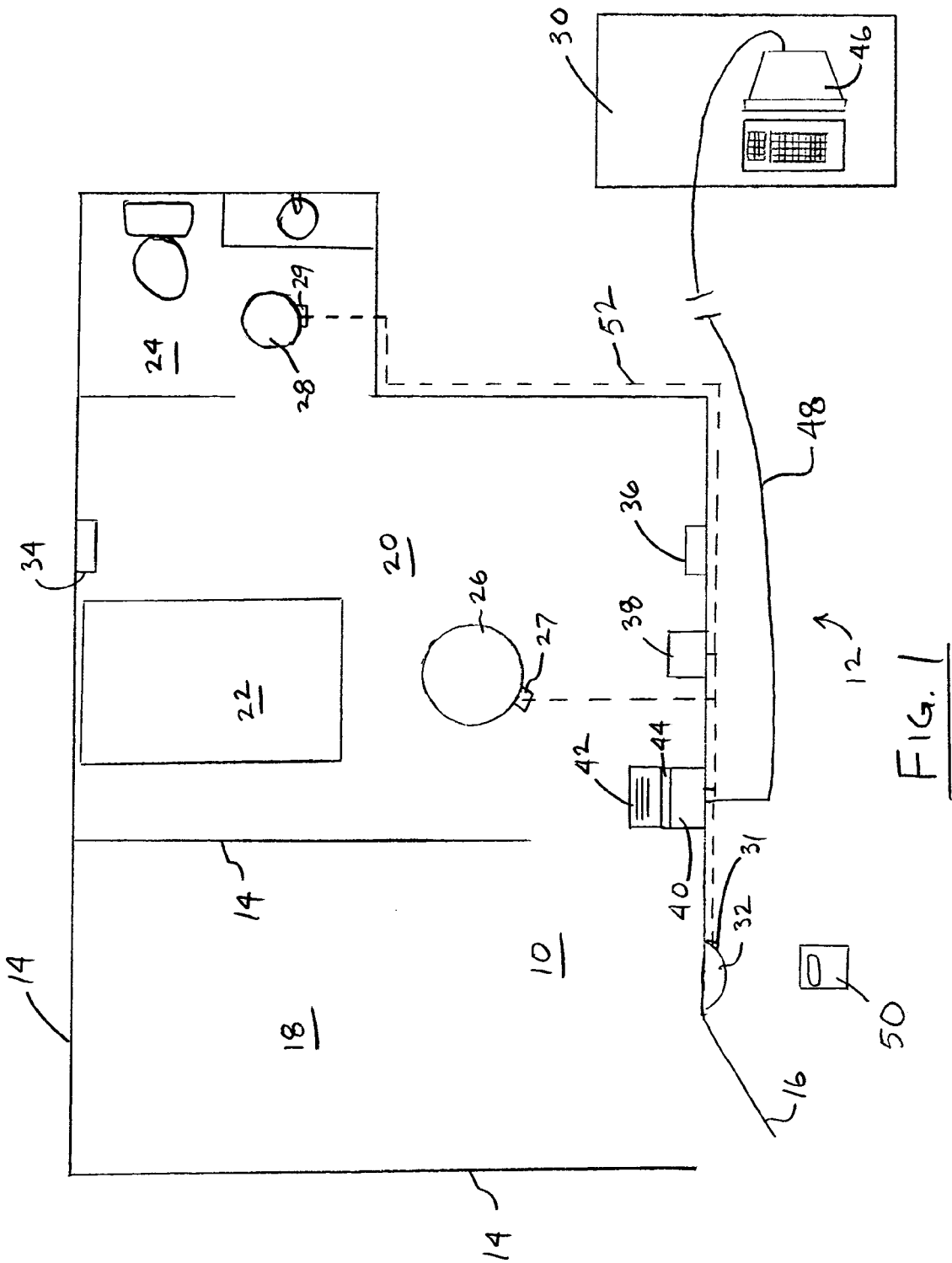
FIG. 1 is a top plan view of an embodiment of a safety system according to the present invention incorporated into a patient's room.
Figure 2:
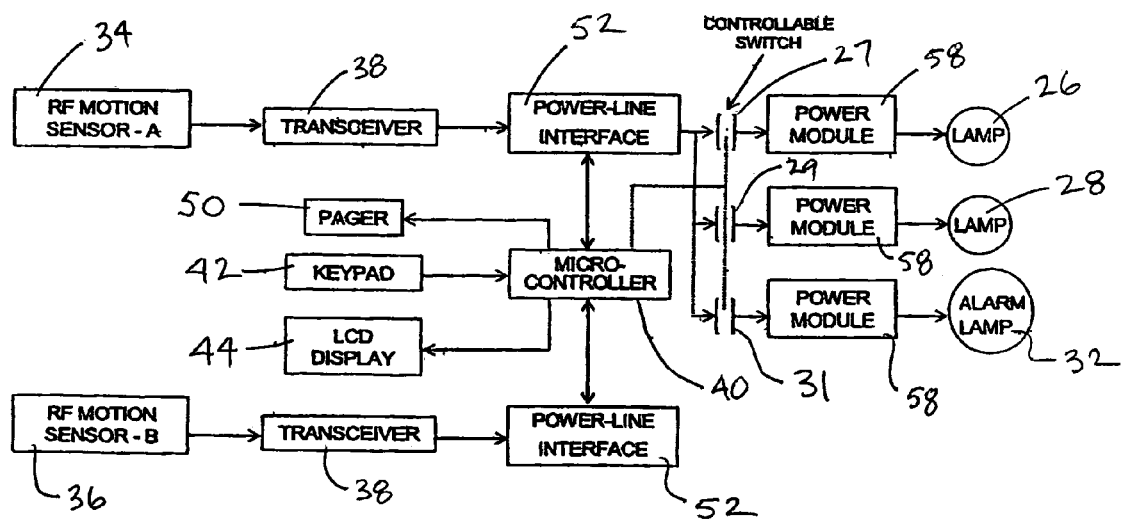
FIG. 2 is a schematic illustrating the components of one embodiment of the present invention.

FIG. 1 shows an overhead plan view of a room that is provided with a safety system 12 according to the present invention. The room 10 is generally enclosed by walls 14. A door 16 provides access to the room 10. The room 10 may be subdivided into a living area 18 and a sleeping area 20. A bed 22 is provided in the sleeping area 20. A restroom 24 with toilet facilities is typically provided adjacent to the sleeping area 20. The room 10 is typically located in an assisted living facility, such as might be used to care for the elderly, though it is not so limited. It will commonly be occupied by a single resident, though it would work for multiple residents. The terms patient, occupant, and resident are used synonymously herein to refer to the occupant of the room 10 without regard to a physical condition of that occupant.

Artificial lighting, such as an overhead light 26 is provided in the sleeping area 20. The sleeping area light 26 may be provided with a control switch 27 for remote controlling of the light. Artificial lighting 28 may also be provided in the restroom 24, and may also be provided with a control switch 29 to permit remote control of the restroom light 28. Preferably, the lights 26 and 28 are controllable such that their illumination levels are variable from a low level to bright level. A work station 30, such as a nurse's station, may be located remotely from the room 10. A personal computer 46, including a display screen, may be provided at the station 30. An outside light 32, including a control switch 31, may be provided near the door 16 in order to illuminate the area around the door, and to provide part of the alarm function of the safety system 12.

A first sensor 34 is provided within the room 20. This first sensor 34 senses when a patient has gotten out of bed 22. In the embodiment shown, the first sensor 34 is a motion sensor that is mounted at approximately knee height in the sleeping area 20. If a patient gets out of bed 22 and walks along the floor, the first sensor 34 will sense that movement. Motion sensors are well known, and those of skill in the art will be aware of many alternatives to serve as the motion sensor. A second sensor 36 may be provided that senses when a patient is in bed 22. This second sensor 36 may also be a motion sensor that is mounted near the ceiling, and which is set to detect lateral movement proximate to the bed 22. In the preferred embodiment shown, the first and second sensors 34 & 36 are radio frequency motion sensors that send signals to a transceiver 38. The transceiver 38 sends the signal received from the sensors 34 and 36 to a micro controller 40. The micro controller 40 may be provided with a keypad 42 for input, and an LCD display screen 44 to display status information.

Figure 3:
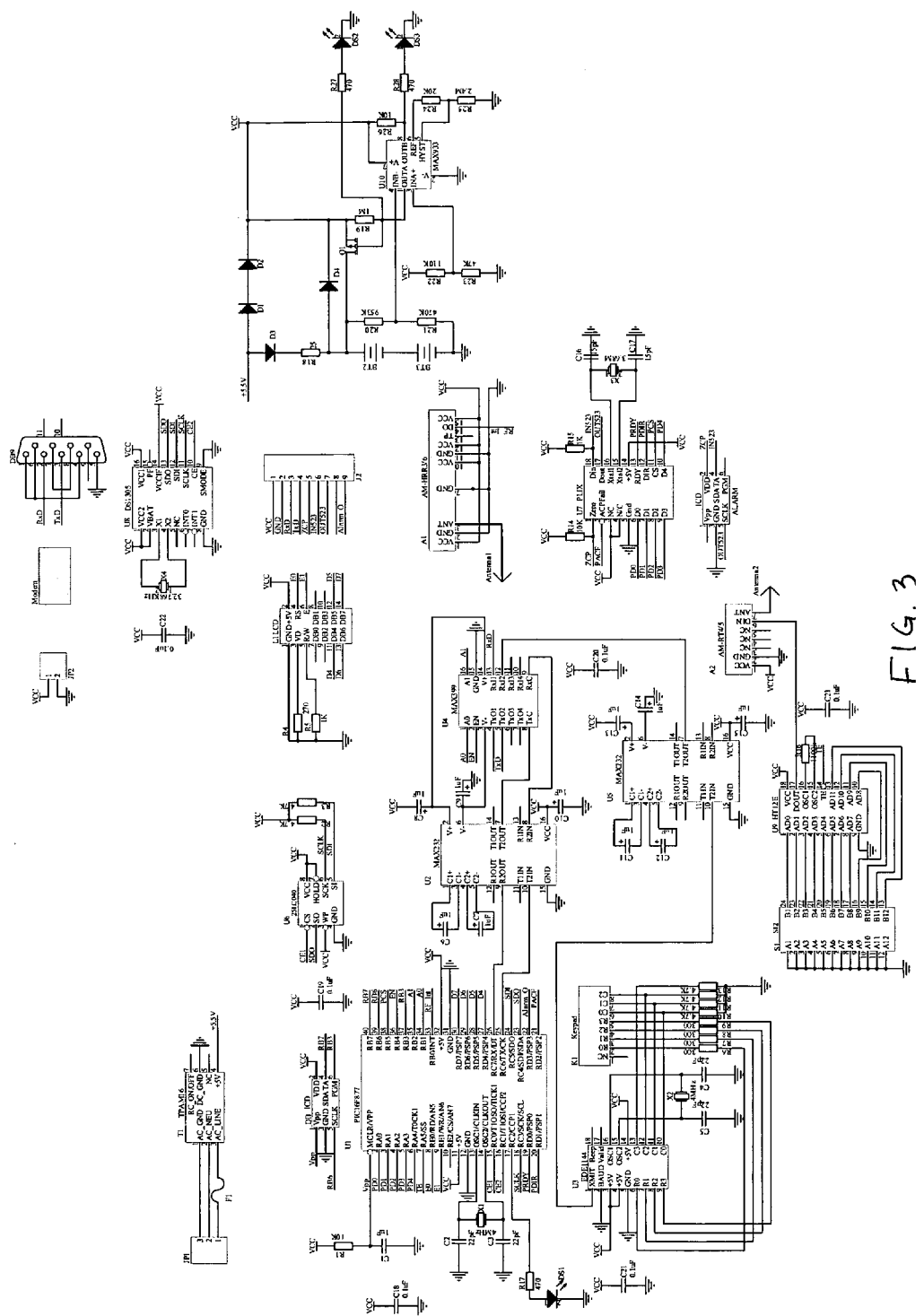
FIG. 3 is a schematic illustration of an arrangement of a CPU according to one embodiment of the present invention.

The micro controller 40 may be a wavelet board, or other type of CPU. The micro controller 40 is used to control the various parts of the safety system 10. A schematic of a possible layout for one embodiment of the CPU of the micro controller is shown in FIG. 3. The micro controller 40 is connected to the personal computer 46 at the work station through cable 48, which may be fiber optics, though other means of communicating with the personal computer 46 will be known. The micro controller 40 is programmed, as for example by assembly code, so that it can interface with the transceiver 38, actuate the two interior lights 26 and 28, communicate with a remote information receiving device 50, communicate with the personal commuter 46, and interface to a key board 42. The remote information receiving device 50, may be a pager or cellular phone. The micro controller 40 can communicate with the remote information receiving device 50 through any known communications mechanisms, including without limitation modem and phone lines, wireless technology, or radio frequency. FIGS. 5-15 show flow charts that illustrate the logical flow of the overall assembly-language code of a preferred embodiment of the present invention, and the logical flow of the various sub-routines and sub-modules in the assembly-language code.

Preferably, the lights 26, 28, & 32, the transceiver 38 are in communication with the micro controller 40 through power line carrier communication carried across a power line 52. Alternatively, they may be wired together using other media, such as fiber optics.

In operation, when an occupant is in bed 22 with the lights off, as would be common during the night, the system 12 is activated either directly by accessing the micro controller 40 through the key board 42, or remotely via the personal computer 46. The system may incorporate a timer so that it is activated only during the evening hours. If the occupant then gets out of bed 22, remote sensor 34 would detect that motion and send a RF signal to the transceiver 38. Transceiver 38 would communicate that occurrence to the micro controller 40 via power line 52. The micro controller would then send a signal to the control switches 27 and 29 to illuminate lights 26 and 28. Preferably the lights 26 and 28 would initially activate at a dim setting, and would slowly increase in brightness in order not to hurt the eyes of the resident who has been sleeping. The sleeping area and bathroom lights 26 & 28 would remain illuminated. If the second sensor 36 then senses that the resident has returned to bed 22, then the second sensor 36 would send a signal to the transceiver 38 which would then send a corresponding signal to the micro controller 40. The micro controller 40 would then cause the sleeping area and restroom lights 26 & 28 to dim off by sending a signal to the control switches 27 & 29.

Also, upon receiving a signal from the transceiver 38 that an occupant has gotten out of bed 22, the micro controller 40 will send a signal to the coach light 32, through its control switch 31 which causes the coach light 32 to illuminate, preferably intermittently in a flashing fashion. A signal will also be sent to the personal computer 46 so that the occurrence of the occupant getting out of bed 22 can be recorded in a log that can be viewed later. The personal computer 46 will also preferably flash a warning to anyone at the work station 30 alerting them that the occupant is out of bed. A signal is also preferably sent to the remote information receiving device 50 that will alert a care giver of the room number where the occupant has gotten out of bed, so that the care giver can check on the status of the occupant. Preferably, the coach light 32 will continue to flash until a care giver has checked on the occupant and reset the system 12 manually by entering the required information into the micro controller 40 at the key board 42. The occurrence of the occupant returning to bed is similarly recorded by the personal computer 46, as is the occurrence of the alarm being reset by the caregiver. In this fashion, the history of an occupant can be reviewed by viewing that resident's log. The timeliness of the care giver's response is also reviewable on the log. Preferably several such micro controllers 40 may be connected to the same personal computer 46 so that several rooms 10 in a facility can be simultaneously monitored.

Figure 4:
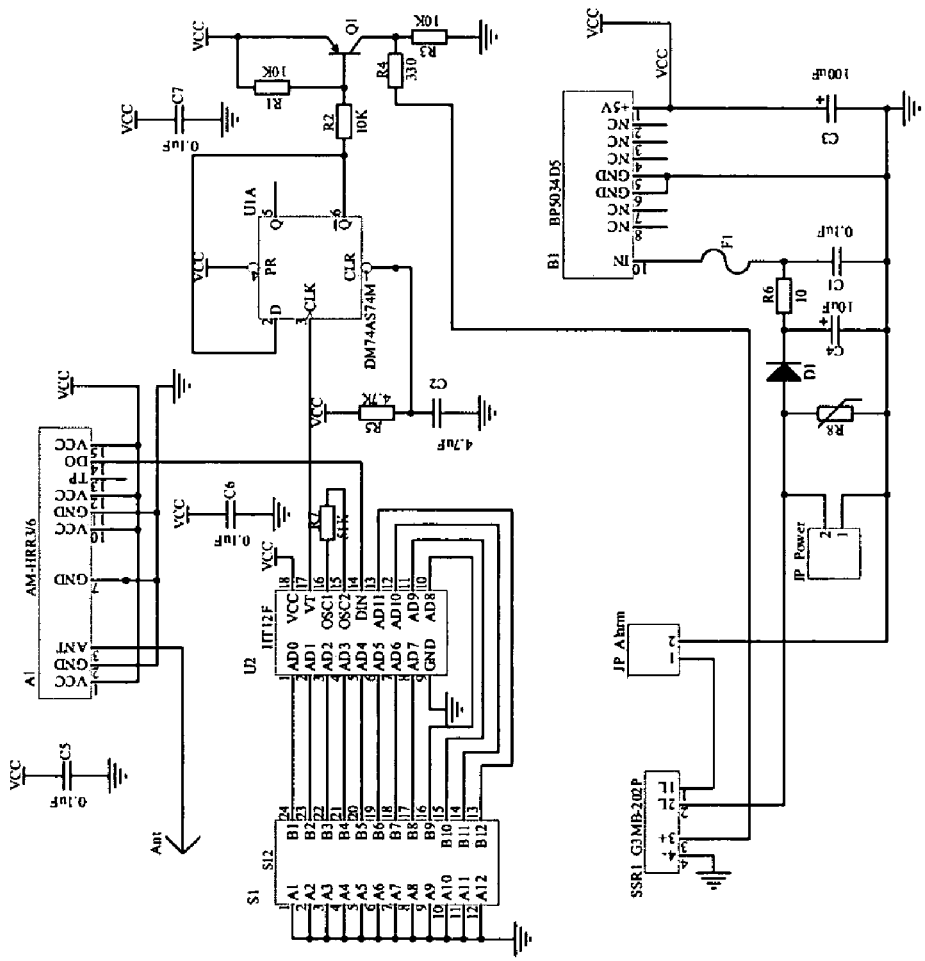
FIG. 4 is a schematic illustration of an alarm circuit according to one embodiment of the present invention.
Figure 5:
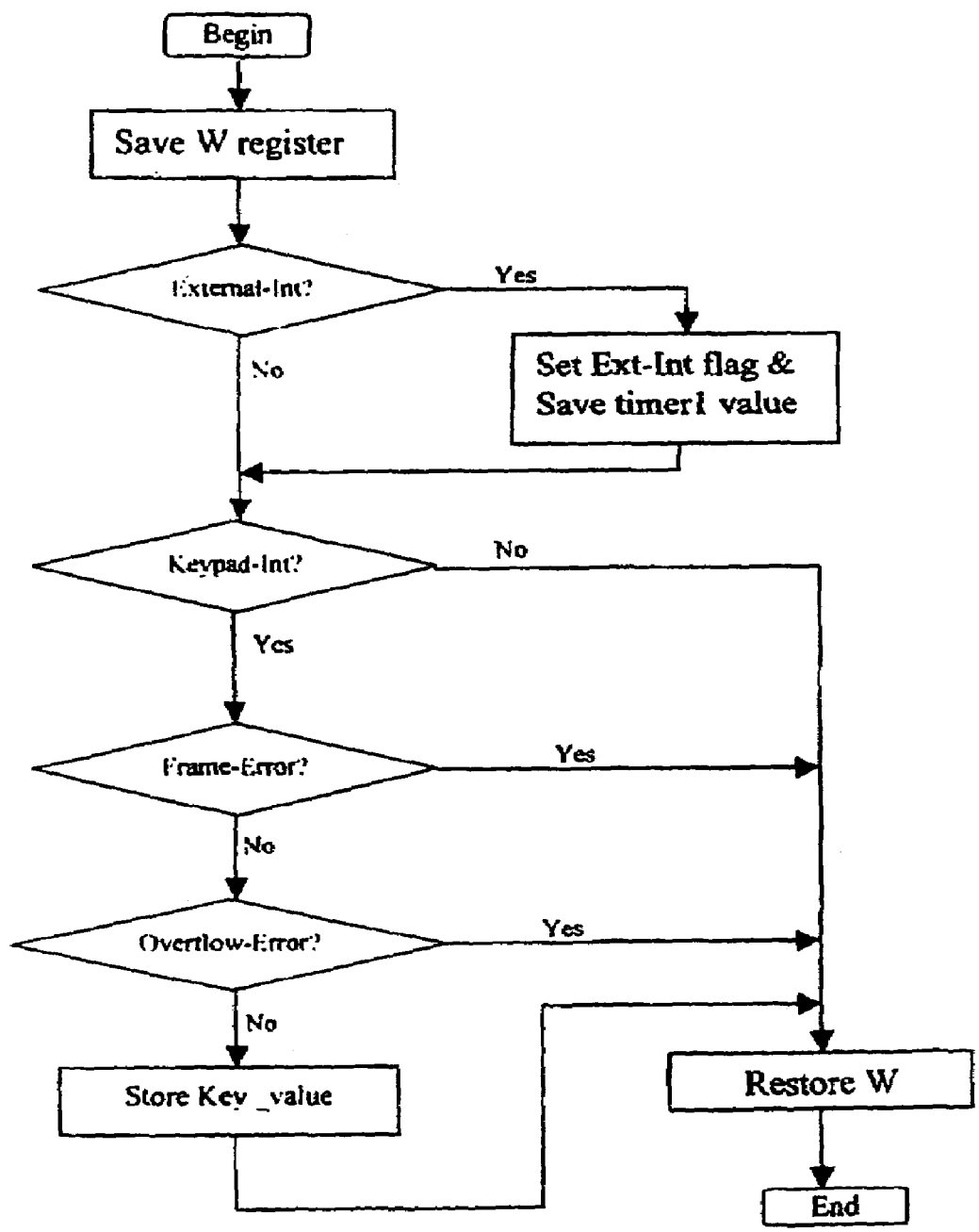
FIG. 5 is a flow chart illustrating a possible interrupt service routine according to the present invention.
Figure 6:
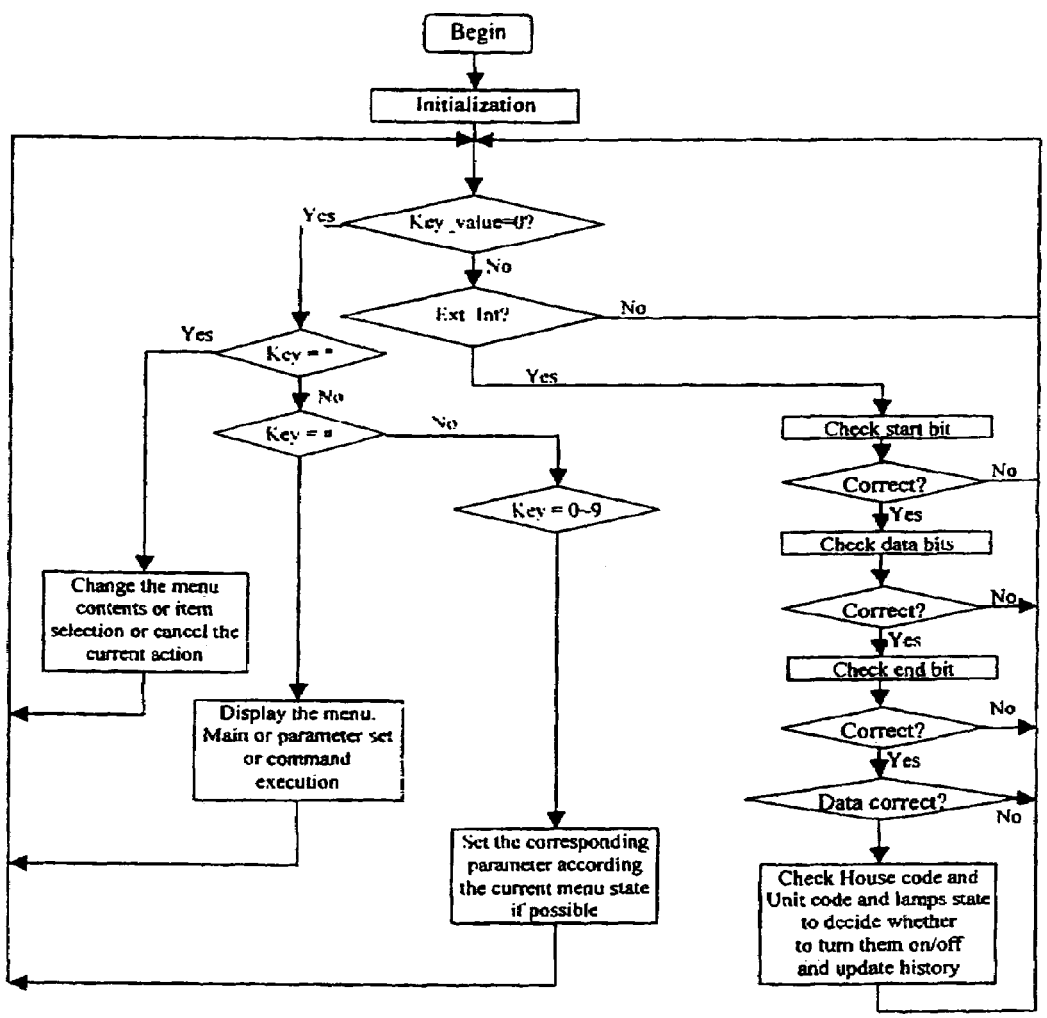
FIG. 6 is a flow chart illustrating a main program routine according to the present invention.
Figure 7:
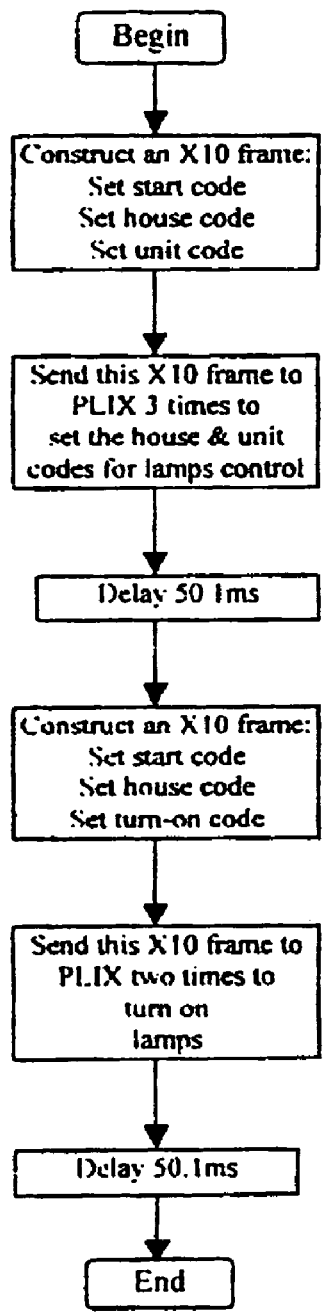
FIG. 7 is a flow chart illustrating a routine to turn on lamps according to the present invention.
Figure 8:
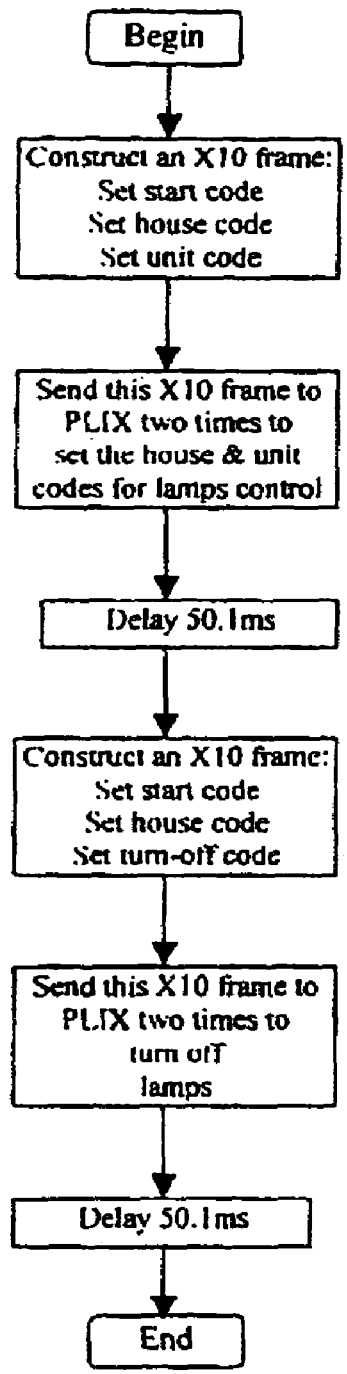
FIG. 8 is a flow chart illustrating a routine to turn off lamps according to the present invention.
Figure 9:
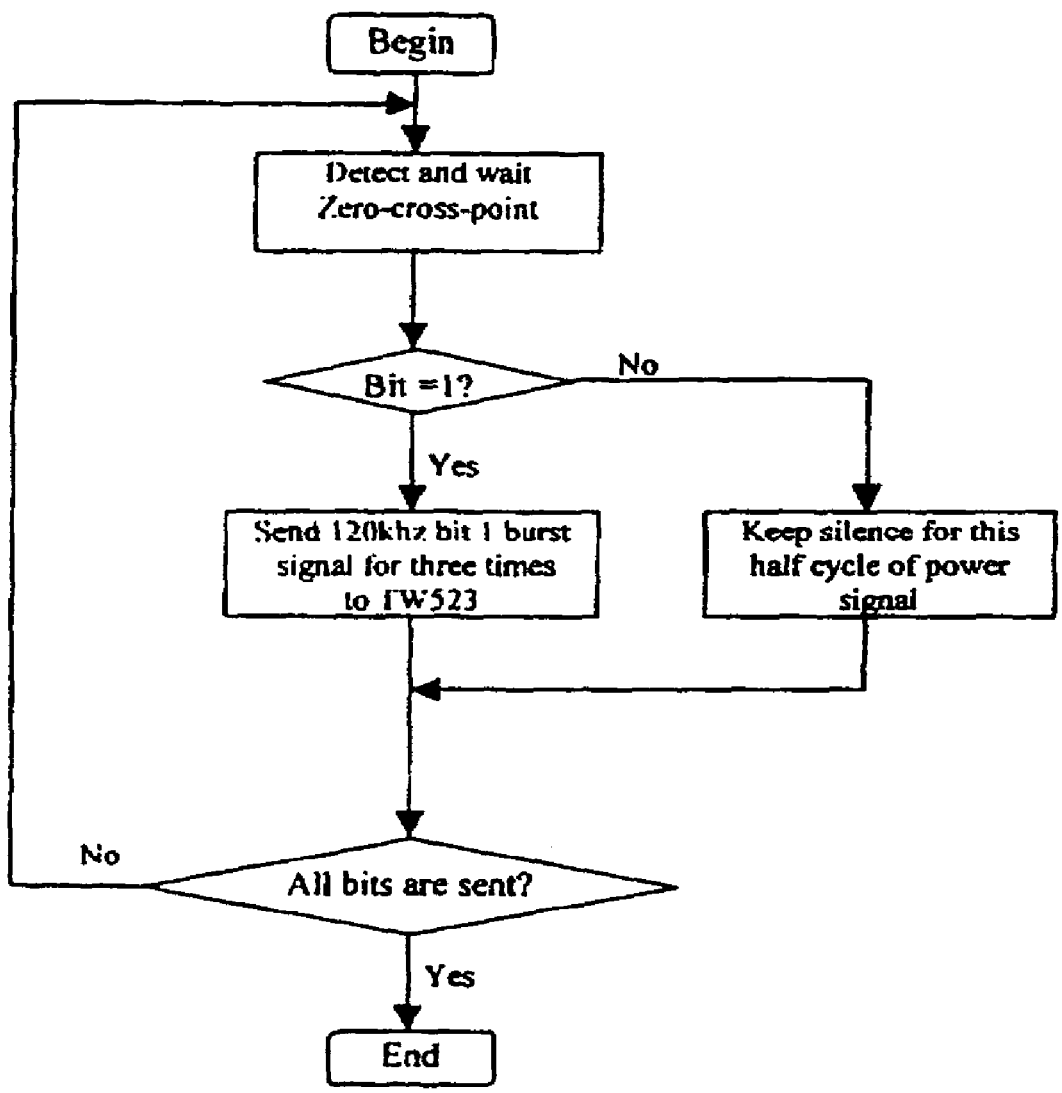
FIG. 9 is a flow chart illustrating a routine to send an X10 frame to PLIX.
Figure 10:
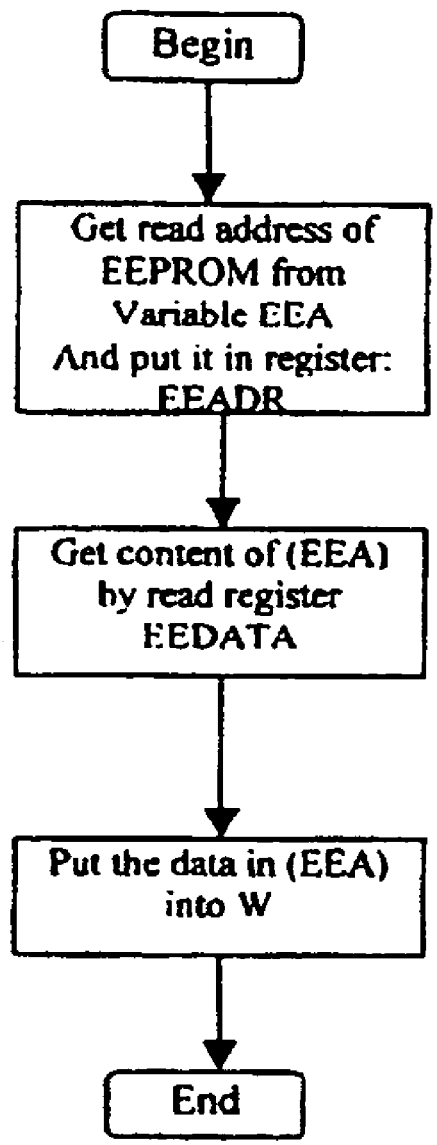
FIG. 10 is a flow chart illustrating a routine to read from the EEPROM.
Figure 11:
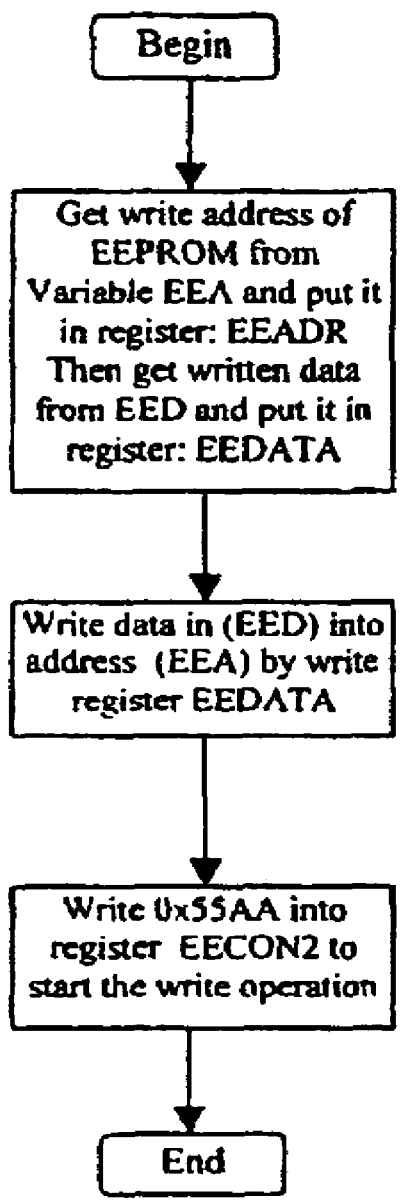
FIG. 11 is a flow chart of a routine to write to the EEPROM.
Figure 12:
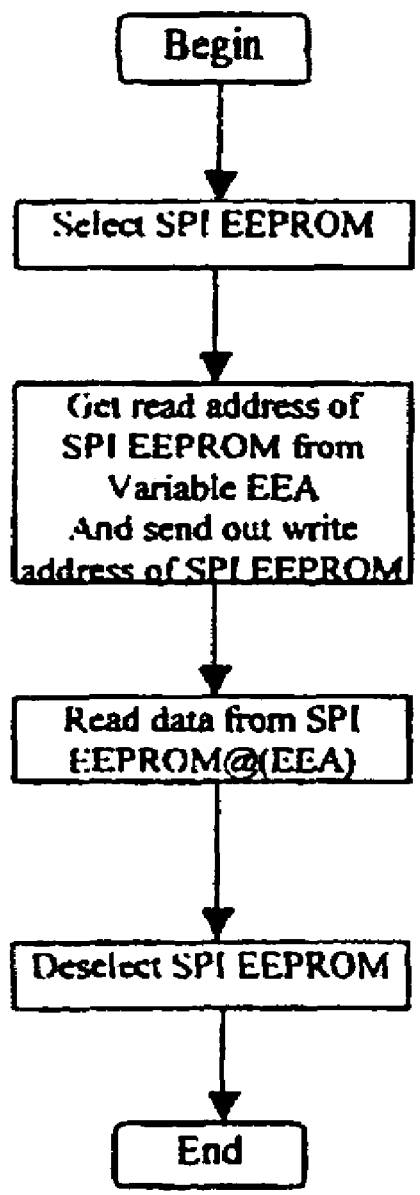
FIG. 12 is a flow chart illustrating a routine to read from the SPI EEPROM.
Figure 13:
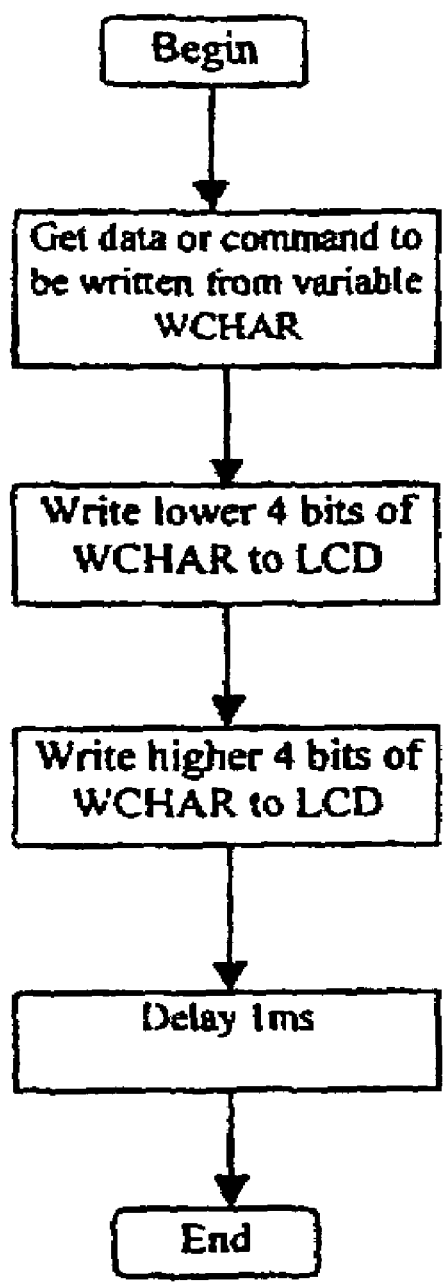
FIG. 13 is a flow chart illustrating a routine to write data or command to a LCD interface.
Figure 14:
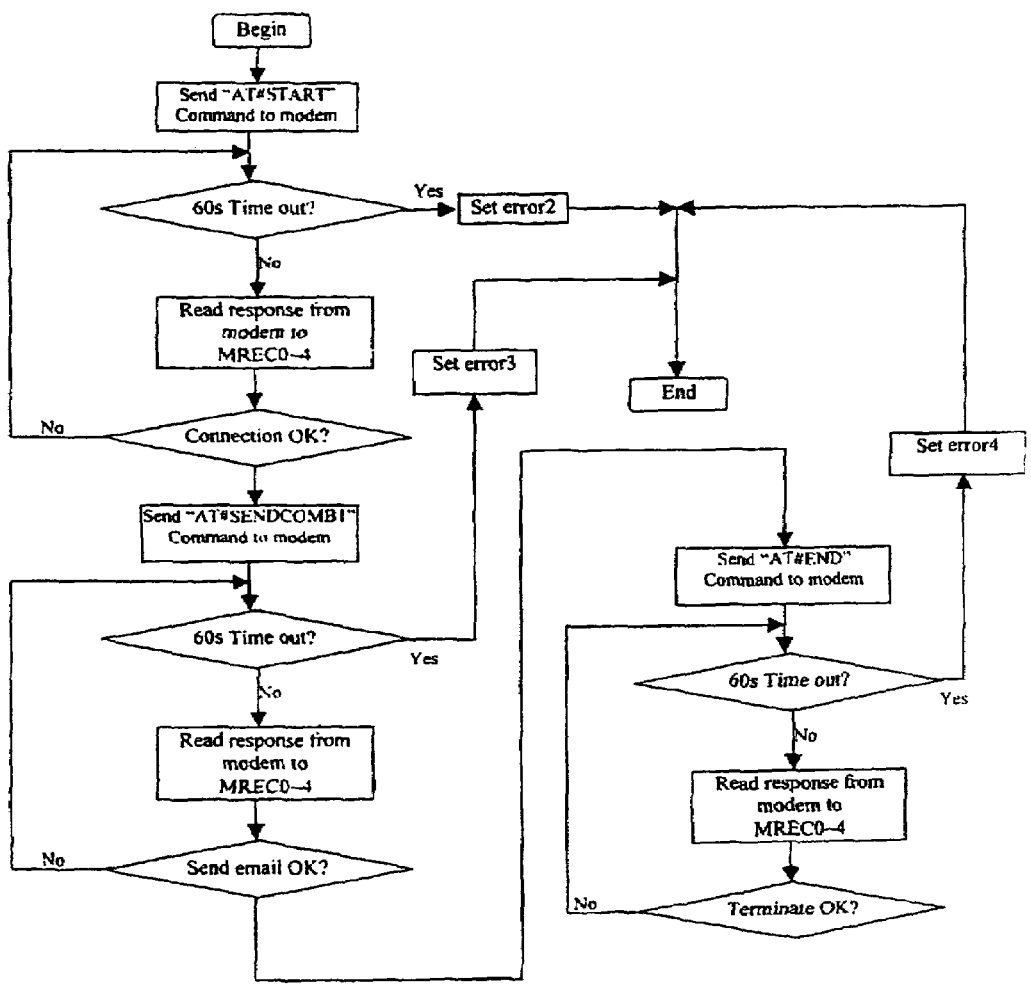
FIG. 14 is a flow chart illustrating a routine to send e-mail notification regarding status of room.
Figure 15:
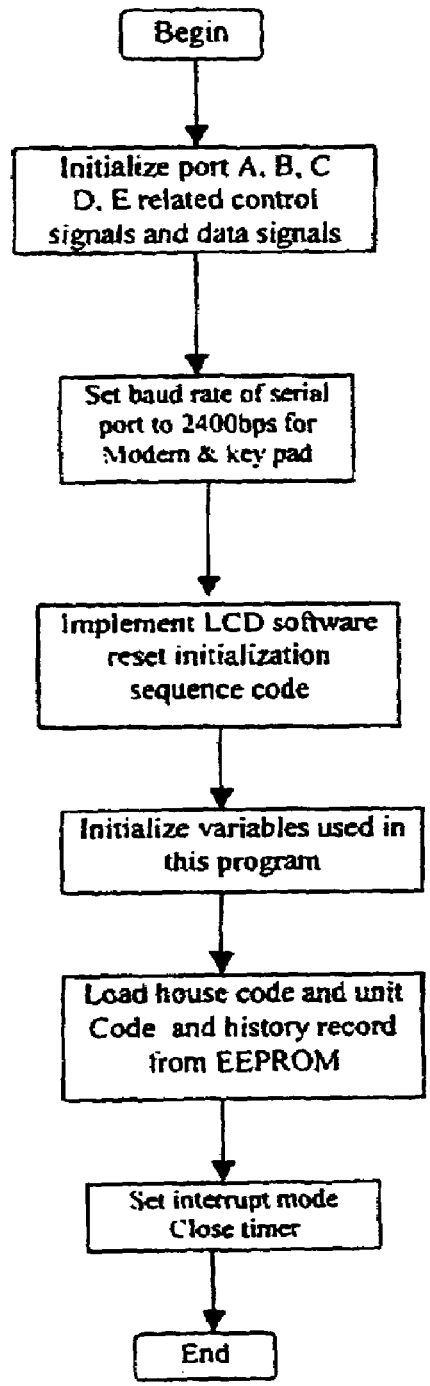
FIG. 15 is a flow chart illustrating the initialization process of the monitoring unit according to the present invention.

A separate programmable controller may be provided that serves to operate the alarm functions. A schematic of such a controller is shown in FIG. 4. Alternatively, the alarm functions can be incorporated into the micro processor 40.

The lights 26, 28, & 32, the sensors 34 & 36, the transceiver 38, and the micro controller 40 may be provided with batteries, or other power modules 58, so that they will function in the event of a power outage.

Because the alarm condition must be reset manually by a caregiver in the room 10, it will encourage the caregiver to check on the status of the of resident to make sure they are able to return to their bed safely. If the resident requires any assistance the caregiver can provide it. If no assistance is needed, the care giver simply resets the system and leaves the room 10 to allow the resident to continue resting. A delay is preferably programmed into the system 12 so that it will not be activated by the motion of the care giver leaving the room. This can be done by programming the micro controller 40 to ignore any signals received from the transceiver 38 during a short period after the system 12 has been reset.

The foregoing description and drawings merely explain and illustrate preferred embodiments of the invention, and the invention is not limited thereto, except insofar as the claims are so limited. Those skilled in the art, who have the disclosure before them, will be able to make modifications and variations therein without departing from the scope of the invention. By way of illustration, while the specification discusses use of motion sensors 34 and 36, other types of sensors might be used for determining whether the occupant of the room is in bed or not. For example, a weight sensor on the bed could be used.

The invention claimed is:

1. A system for improving the safety of a room occupied by a patient in a bed, particularly when the room is dark and the room is provided with artificial lighting, the system comprising:

a first sensor for detecting when the patient has gotten out of bed, said first sensor activating the artificial lighting upon detecting that the patient is out of bed;

wherein the artificial lighting can be varied in intensity, and further wherein upon said first sensor activating the artificial lighting the artificial lighting is activated at a dim level and slowly increased in intensity; and a recording device in connection with said first sensor, said recording device making a log entry of times when said first sensor was activated.

2. The system according to claim 1, wherein said first sensor is a motion sensor.

3. The system according to claim 1, further comprising a second sensor for sensing when the patient has returned to bed, said second sensor sending a second signal upon detecting that the patient has returned to bed, said second signal causing said artificial lighting to dim.

4. The system according to claim 1, further comprising an indicator light outside the room, said indicator light being activated when said sensor detects that the patient has gotten out of bed, said indicator light remaining activated until manually deactivated.

5. The system according to claim 1, wherein said recording device also makes a log entry when said indicator light has been manually deactivated.

6. The system according to claim 1, wherein said recording device is connected to a personal computer so that data from the recording device can be transferred to the personal computer.

7. The system according to claim 6, wherein the connection between said personal computer and said recording device is a fiber optic cable.

8. The system according to claim 1, wherein the connection between said recording device and said first sensor is a fiber optic cable.

9. The system according to claim 1, wherein said recording device is a wavelet board.

10. The system according to claim 6, wherein said personal computer has software which enables it to record and manage data from numerous recording devices.

11. The system according to claim 6, wherein said personal computer has software that enables it to control the recording device.

12. A system for improving the safety of a room occupied by a patient in a bed, particularly when the room is dark and the room is provided with artificial lighting, the system comprising:

a first sensor for detecting when the patient has gotten out of bed, said sensor activating the artificial lighting upon detecting that the patient is out of bed; and wherein the artificial lighting can be varied in intensity, and further wherein upon said first sensor activating the artificial lighting the artificial lighting is activated at a dim level and slowly increased in intensity;

a second sensor for sensing when the patient has returned to bed, said second sensor sending a second signal upon detecting that the patient has returned to bed, said second signal causing said artificial lighting to dim: and a bathroom light, wherein said bathroom light is also activated when said first sensor detects that the patient is out of bed.

13. A system for improving the safety of a room occupied by a patient in a bed, particularly when the room is dark and the room is provided with artificial lighting, the system comprising:

a first sensor for detecting when the patient has gotten out of bed, said first sensor activating the artificial lighting upon detecting that the patient is out of bed; and a recording device in connection with said first sensor, said recording device making a log entry of times when said first sensor has been activated and a log entry when an indicator light outside the room has been activated when said sensor detects that the patient has gotten out of bed, said indicator light remaining activated until manually deactivated.

14. A system for improving the safety of a room occupied by a patient in a bed, particularly when the room is dark and the room is provided with artificial lighting, the system comprising:

a first sensor for detecting when the patient has gotten out of bed, said first sensor activating the artificial lighting upon detecting that the patient is out of bed; wherein said first sensor provides a radio frequency signal to a first transceiver when it detects that the patient has gotten out of bed;

a first power line interface and a micro controller; said power line interface being connected between said first transceiver and said micro controller; said micro controller further being connected to said artificial lighting, said first transceiver sending an activation signal to said micro controller when said first transceiver receives a radio frequency signal from said first sensor; and said micro controller sending a signal that activates said artificial lighting upon receiving said activation signal from said micro controller; and wherein the artificial lighting can be varied in intensity, and further wherein upon said first sensor activating the artificial lighting the artificial lighting is activated at a dim level and slowly increased in intensity.

15. The system according to claim 14, wherein said micro controller controls the activation and dimming of said artificial lighting through power modules connected between said micro controller and said artificial lighting.

16. The system according to claim 14, wherein said micro controller provides notice to a remote system when it receives an activation signal.

17. The system according to claim 16, wherein said notice to said remote system includes information regarding a location of said first remote sensor.

18. A system for improving the safety of a room occupied by a patient in a bed, particularly when the room is dark and the room is provided with artificial lighting, the system comprising:

a first sensor for detecting when the patient has gotten out of bed, said first sensor activating the artificial lighting upon detecting that the patient is out of bed; wherein the artificial lighting can be varied in intensity, and further wherein upon said first sensor activating the artificial lighting the artificial lighting is activated at a dim level and slowly increased in intensity; and a second sensor for sensing when the patient has returned to bed, said second sensor sending a second signal upon detecting that the patient has returned to bed, said second signal causing said artificial lighting to dim.

19. The system according to claim 18, wherein a bathroom light is also activated when said first sensor detects that the patient is out of bed.

20. The system according to claim 18, wherein an alert is provided to a caregiver by a remote device for receiving information when said first sensor detects that the patient is out of bed.

21. The system according to claim 18, wherein said first sensor provides a radio frequency signal to a first transceiver when it detects that the patient has gotten out of bed.

\* \* \* \* \*